United States Patent
Van Weeren et al.

(10) Patent No.: US 11,346,653 B2
(45) Date of Patent: May 31, 2022

(54) METHOD OF AND APPARATUS FOR MONITORING POSITIONS ON AN OBJECT

(71) Applicant: FNV IP B.V., Leidschendam (NL)

(72) Inventors: Dennis Van Weeren, Nieuw (NL); Amoud Marc Jongsma, Vijfhuizen (NL); Joachim Ulrich Seibert, Rijswijk (NL)

(73) Assignee: FNV IP B.V.

( * ) Notice: Subject to any disclaimer, the term of this patent is extended or adjusted under 35 U.S.C. 154(b) by 0 days.

(21) Appl. No.: 16/963,754

(22) PCT Filed: Jan. 22, 2019

(86) PCT No.: PCT/NL2019/050035
§ 371 (c)(1),
(2) Date: Jul. 21, 2020

(87) PCT Pub. No.: WO2019/143249
PCT Pub. Date: Jul. 25, 2019

(65) Prior Publication Data
US 2020/0355491 A1    Nov. 12, 2020

(30) Foreign Application Priority Data
Jan. 22, 2018  (NL) ..................................... 2020304

(51) Int. Cl.
*G01B 11/16*  (2006.01)
*G01B 11/00*  (2006.01)

(52) U.S. Cl.
CPC ............ *G01B 11/16* (2013.01); *G01B 11/002* (2013.01)

(58) Field of Classification Search
CPC ........... G01S 5/16; G01S 1/70; G01B 11/002; G01B 11/16; G01B 11/161; G01C 11/06;
(Continued)

(56) References Cited

U.S. PATENT DOCUMENTS 6,324,296 B1 * 11/2001  McSheery ................. G06T 7/80
                                                        250/203.3
7,813,529 B1 * 10/2010  Gershenson ............ G06T 7/571
                                                         382/106
(Continued)

FOREIGN PATENT DOCUMENTS

EP    0717261 A2    6/1996
EP    1580523 A1    9/2005
(Continued)

OTHER PUBLICATIONS

International Search Report and Written Opinion; PCT Application No. PCT/NL2019/050035; dated Jun. 17, 2019.
(Continued)

*Primary Examiner* — Christopher S Kelley
*Assistant Examiner* — Kathleen M Walsh
(74) *Attorney, Agent, or Firm* — Polsinelli PC

(57) ABSTRACT

An apparatus monitors positions on an external object having at least one beacon (1($i$), $i$=1, 2, . . . , I) attached to it. The apparatus has an image sensor (11), a lens system (13) and a processing unit (9). The lens system (13) receives at least one light beam (5($i$)) transmitted from the at least one beacon (1($i$)) and transfer the at least one light beam (5($i$)) to the image sensor (11). The image sensor (11) forms image data. The processing unit (9) identifies the at least one beacon (1($i$)) within the image data based on the at least one light beam (5($i$)), determines current location data of the at least one beacon (1($i$)) based on the image data, compares the current location data with former location data of the one or more beacons (1($i$)) as stored in a memory (15) and determines whether the object has moved relative to a fixed reference frame based on the comparison.

8 Claims, 9 Drawing Sheets

(58) Field of Classification Search
CPC .......... G01C 15/04; G01C 3/14; G06T 7/248; H04N 5/2252; H04N 5/2256
USPC .......................................... 348/135; 356/35.5
See application file for complete search history.

(56) References Cited

U.S. PATENT DOCUMENTS

| | | | | |
|---|---|---|---|---|
| 9,103,671 | B1* | 8/2015 | Breed | G01S 13/931 |
| 10,121,248 | B2* | 11/2018 | Leuschner | G01C 21/203 |
| 10,236,986 | B1* | 3/2019 | Shatz | H04B 10/1121 |
| 2008/0262718 | A1* | 10/2008 | Farwell | G05D 1/0244 |
| | | | | 701/445 |
| 2010/0060962 | A1* | 3/2010 | Rosen | G03H 1/06 |
| | | | | 359/29 |
| 2012/0146813 | A1 | 6/2012 | Gilmore | |
| 2014/0198206 | A1 | 7/2014 | Murray | |
| 2016/0010989 | A1* | 1/2016 | Booij | H04N 5/23216 |
| | | | | 348/135 |
| 2017/0146659 | A1* | 5/2017 | Kovermann | G01S 17/74 |
| 2017/0244484 | A1* | 8/2017 | Shatz | H04B 17/23 |
| 2017/0328982 | A1 | 11/2017 | Jongsma et al. | |
| 2018/0095155 | A1* | 4/2018 | Soni | G08G 5/0086 |
| 2018/0240318 | A1* | 8/2018 | Haynes | H04W 4/80 |
| 2020/0011995 | A1* | 1/2020 | Send | G01S 7/4814 |
| 2021/0041220 | A1* | 2/2021 | Van Weeren | G01B 11/161 |
| 2021/0223395 | A1* | 7/2021 | Valouch | G01C 11/02 |

FOREIGN PATENT DOCUMENTS

| | | |
|---|---|---|
| EP | 1983397 A2 | 10/2008 |
| EP | 2910967 A1 | 8/2015 |
| JP | 2009300324 A | 12/2009 |
| WO | 2006122747 A1 | 11/2006 |
| WO | 2008148053 A1 | 12/2008 |
| WO | 2016068715 A1 | 5/2016 |
| WO | 2019143249 A1 | 7/2019 |

OTHER PUBLICATIONS

Kozlova, Anna: "Motion Capture: What is it?", May 13, 2017, XP002784973, retrieved from Internet: URL:https://teslasuit.ip/blog/motion-capture-what-it-is on Sep. 20, 2018.

Park, Hyo Seon et al., "Deformation Monitoring of a Building Structure Using a Motion Capture System", IEEE, ASME Transactions of Mechatronics, vol. 20, No. 5, Oct. 1, 2015, pp. 2276-2284, XP002784974.

English abstract of JP2009300324; retrieved from www.epsacenet.com on Jul. 17, 2020.

* cited by examiner

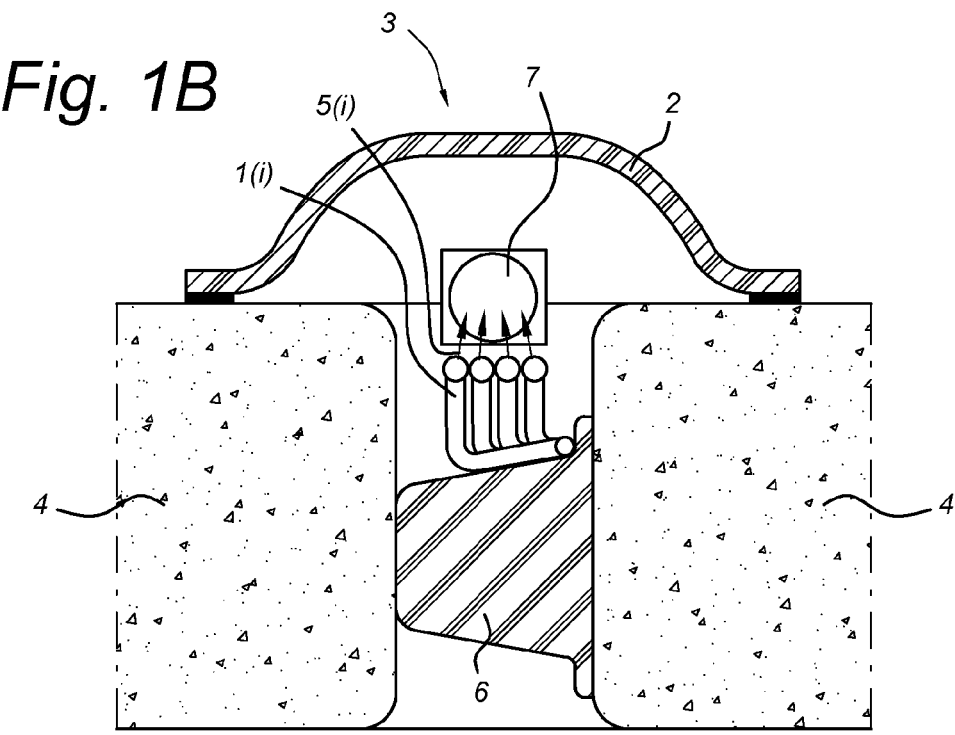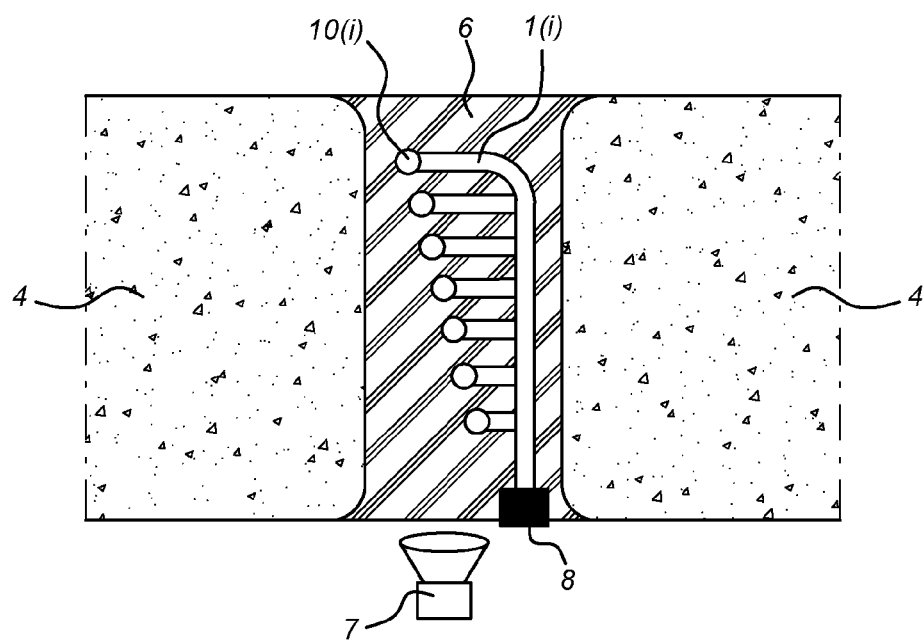

METHOD OF AND APPARATUS FOR MONITORING POSITIONS ON AN OBJECT

CROSS-REFERENCE TO RELATED APPLICATIONS

This application is a national stage application of International Application No. PCT/NL2019/050035, which was filed on Jan. 22, 2019, which claims priority to Netherlands Application Number 2020304 filed on Jan. 22, 2018, of which is incorporated by reference in its entirety.

FIELD OF THE INVENTION

The present invention relates to a method of and apparatus for monitoring positions on an object.

BACKGROUND ART

Such a system is known from patent document WO 2016/068715 A1 disclosing an underwater positioning system providing positioning information for a rover, moveable within a reference frame. Such a system may comprise at least one beacon having a light source located at a fixed position within the reference frame, an underwater imaging device mounted to a rover in order to observe the beacon's light source from different viewpoints for the determining of direction data representing a direction or change thereof of the beacon's light source with respect to the rover's imaging device. This known system is required to operate in a very low light or dark environment, namely on the seabed. Higher levels of ambient light could interfere with the functioning of the system.

EP 1 983 397 discloses a system and method for landmark navigation employing optical beacons deployed at locations throughout a field of operation of a vehicle. The optical beacons emit or reflect an optical signal at a predetermined blink frequency. The locations of the optical beacons may or may not be known to the vehicle. At least one imaging device on the vehicle, such as a digital camera, captures images in the field of operation, and in particular a pair of image frames such that the time interval between the image frames of the pair is equal to one-half of the blink period of the optical signal. Data is generated that represents a difference frame between two image frames captured by the imaging device. Pixel locations of optical beacons in the difference frame are identified. The position and orientation of the vehicle is determined from data representing pixel locations of optical beacons in the difference frame. The field of view of several cameras are aligned to see as many optical beacons as possible at any one moment because a better position calculation can be made when data from more optical beacons are captured in the image frames. This document is concerned with the position and orientation of the vehicle and not with the position of the beacons. The position of the beacons is assumed to be fixed. I.e., this document uses a moving camera to position a vehicle using static LED beacons. The use of a moving camera imposes limitations on the signal processing resulting in noisy measurements and the possibility of detecting "ghost" beacons (false positives). Moreover, this document has no way of identifying the attitude (pitch/roll) of the LED beacons. Document has no direct way of identifying the beacons. Identification of beacons relies on an internal database of known beacon positions.

US2008/0204699 discloses a method and a system for determining the position of a receiver unit. Modulated radiation is generated by at least one radiation projector, and a number of reference points, from among which reference points lying within a detection range of the receiver unit are detected, are projected by means of said modulated radiation. Positional data, particularly location data and/or orientation data, is derived for the receiver unit from the radiation of said reference points. This document shows signal curves as a function of time, based on the transit time measuring principle. In each case variables are plotted as a function of time. The document shows a graph showing. at the uppermost point, the ppm-accurate standard time of the receiver unit as a square-wave signal. The received signals from four reference points are shown underneath. The signals emitted as laser pulses have a pulse repetition time $T_{Rep}$, a time window—for example due to the use of delay lines—existing on the transmitter and receiver side for each laser. The duration of the time windows $T_{Laser1}$-$T_{Laser4}$ is identical. Based on the time zero point $t_0$, the receiver unit receives four pulses at the times $t_1$-$t_4$, to which a transit time $t_1'$-$t_4'$ corresponds within the respective time window. These signal curves as a function of time are recorded by the receiver unit in the zero position, and the change, i.e. the change of the times t1-t4 or transit times t1'-t4', relative to this profile is evaluated continuously for position determination. Here, a corresponding distance can be coordinated with each transit time t1'-t4'. The change of the distances is correlated with a change in location of the receiver unit, so that a change in location or in orientation can be derived. Both the complete distance to the reference point or to the radiation source and only the change of the distance can be evaluated. This document calculates the position of the receiver unit relative to the reference points and starts with the assumption that the location of these reference points is fixed. Moreover, this document describes a simple time delay method to identify different beacons but that does not allow telemetry of other information.

WO2008/148053 describes a system whereby coordinates of beacons are transmitted over the light beam. However, the document does not describe a system to calculate ray angles to the beacons and is thus by nature less accurate.

SUMMARY OF THE INVENTION

The problem addressed by the present document is how to monitor the location of an object over time. More specifically, the addressed problem relates to monitoring objects, like buildings, which should have a fixed position relative to the earth but move over time. They may show a slowly moving height and attitude, i.e., pitch and roll, over time. Causes may relate to soft ground on which the building stands, underground construction works below the building (e.g. to build an underground parking lot or subway), and earth quakes (e.g. caused by natural gas extraction from earth locations below the building).

More specifically, it is the objective of the present invention to overcome the shortcomings of the prior art to allow sensing directional data from beacons in bright ambient light. It is a further objective of the present invention to provide a method to suppress the signal created in the image sensor, caused by spurious light from the environment.

Accordingly the present invention provides an apparatus as defined in independent claim 1.

The invention also provides an apparatus arranged to communicate with beacons based on transmission and reception of light beams by modulating light intensity and/or wavelength of the light beams, as claimed in a further independent claim.

Moreover, the invention provides a beacon arranged to communicate with other devices based on transmission and reception of light beams by modulating light intensity and/or wavelength of the light beams, as claimed in a further independent claim.

Also, the invention provides a system with an apparatus as defined above, and an object, such as a building, provided with one or more beacons, as claimed in a further independent claim.

Also, the invention provides some methods as claimed in further independent claims.

Advantageous embodiments are claimed in the dependent claims.

According to an embodiment of the invention, an apparatus is provided in which an image sensor senses light beams from beacons and creates image data. A processing unit identifies the respective beacon based on said light beams within the image date. The identification of the respective beacons is preferably based on the respective beacon's light signature. It is the goal of the present invention to allow a processor unit to lock onto a respective beacon's light signature.

According to another embodiment of the invention, the beacons are identified by an individual modulation signal. Such a modulation can be performed in the brightness of the light beam emitted by the respective beacon. Preferably such a modulation comprises a periodic component. To identify the respective beacon, Fourier transformations or alternatively correlation and autocorrelation techniques can be used.

According to another embodiment of the invention, the beacons' light signatures can comprise a certain wavelength or change in wavelength.

According to yet another aspect of the invention, the beacons' light signature can comprise a certain combination of wavelengths, e.g. a certain combination of RGB colours, or any combination of colours available from artificial light sources. In such an embodiment, the beacons can be identified by a respective Red-Green-Blue (RGB) sensor response.

According to yet another embodiment of the present invention, the beacons' light signature can comprise light polarisation states, such a linear polarisation orientations, elliptical or circular polarisations. In such an embodiment the beacons can be identified with common polarisation analysers, while not showing any significant signature to the naked eye.

In an alternative embodiment, the light emitting part of the beacons can be formed by the end of an optical waveguide, such as optical fibres. Such embodiments allow the beacons to be very small while the light source can be remote, thereby allowing beacons to be accommodated in limited spaces.

In alternative embodiments, the invention makes use of known light signatures of warning and/or navigation lights or strobes on well-defined locations, such as lighthouses, transmission masts or towers and other tall structures. In such embodiments, depending on the type of building, the warning or navigation lights or strobes can provide a reference frame for the system.

The beacons of the present invention may be provided with an autonomous energy source, such a solar cells, wind generators, rechargeable batteries, and alike.

The controller of the beacons of the invention may be pre-programmed to emit a particular predetermined light signature.

In alternative embodiments of the invention, the beacons may be provided with a communication unit such as a light communication unit or a networking device. In such embodiments the controller of the beacons can be re-programmed. Further, a beacon can also be activated or deactivated remotely. Such embodiments allow the controlling of a beacon without the necessity of physical access to the location at which the beacon is mounted.

In a further embodiment, the beacons may be equipped with an image sensor and respective optics. This allows for beacons also acting as measurement devices. Further, in such an embodiment, the beacons can form a MESH network.

BRIEF DESCRIPTION OF THE DRAWINGS

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

Figure 1A:
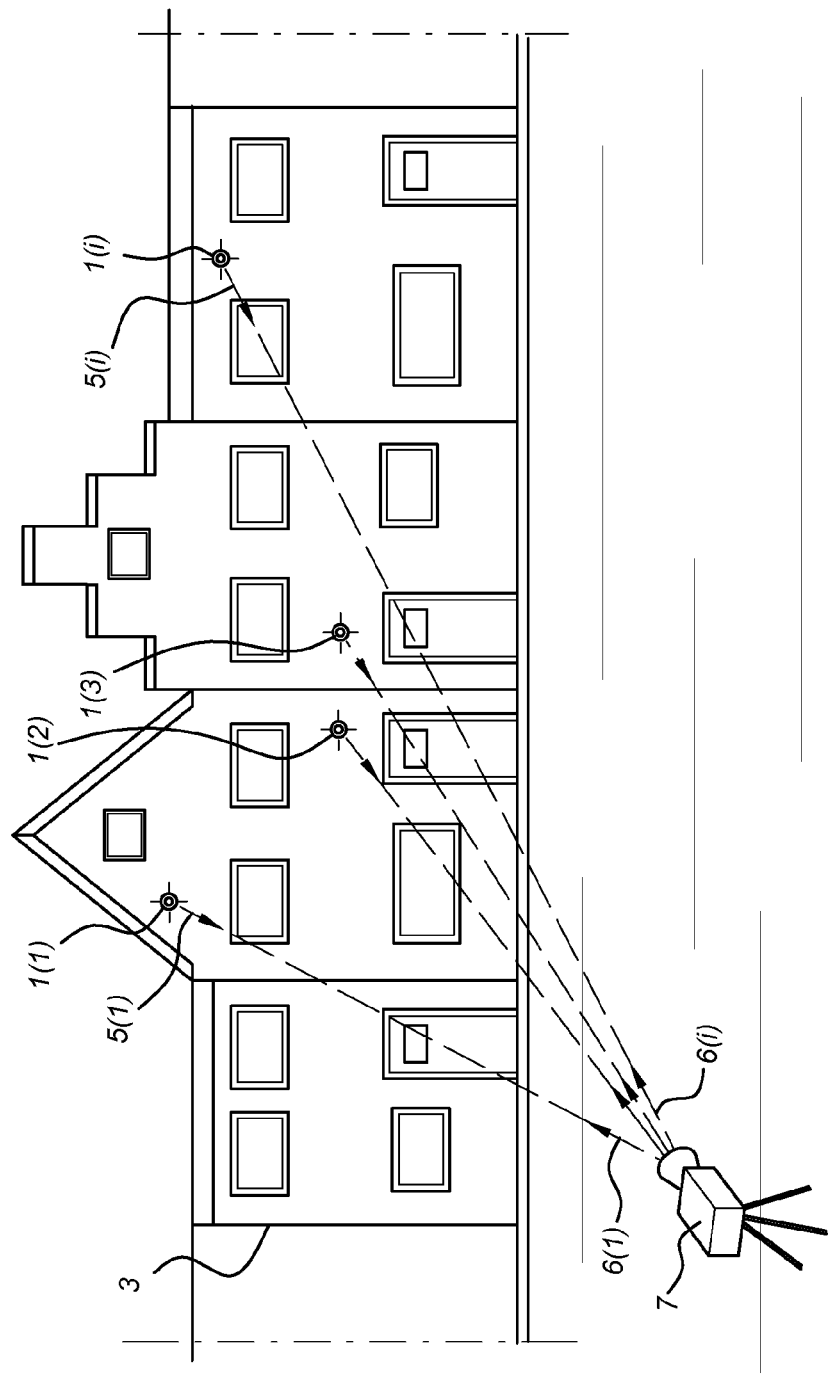

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for" "having the capacity to" "designed to" "adapted to" "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

For the purpose of determining the extent of protection conferred by the claims of this document, due account shall be taken of any element which is equivalent to an element specified in the claims.

Figure 2:
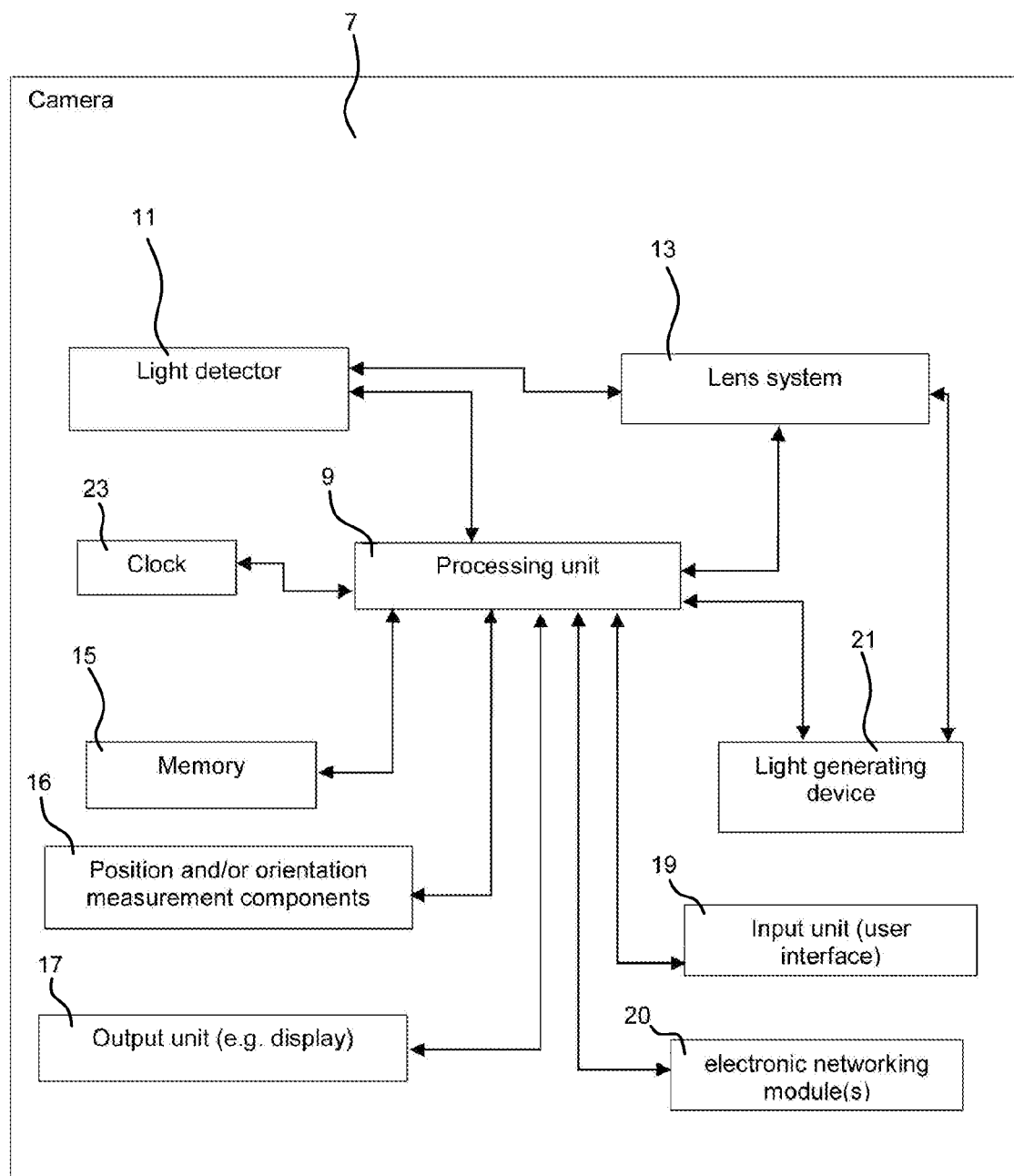
Figure 3:
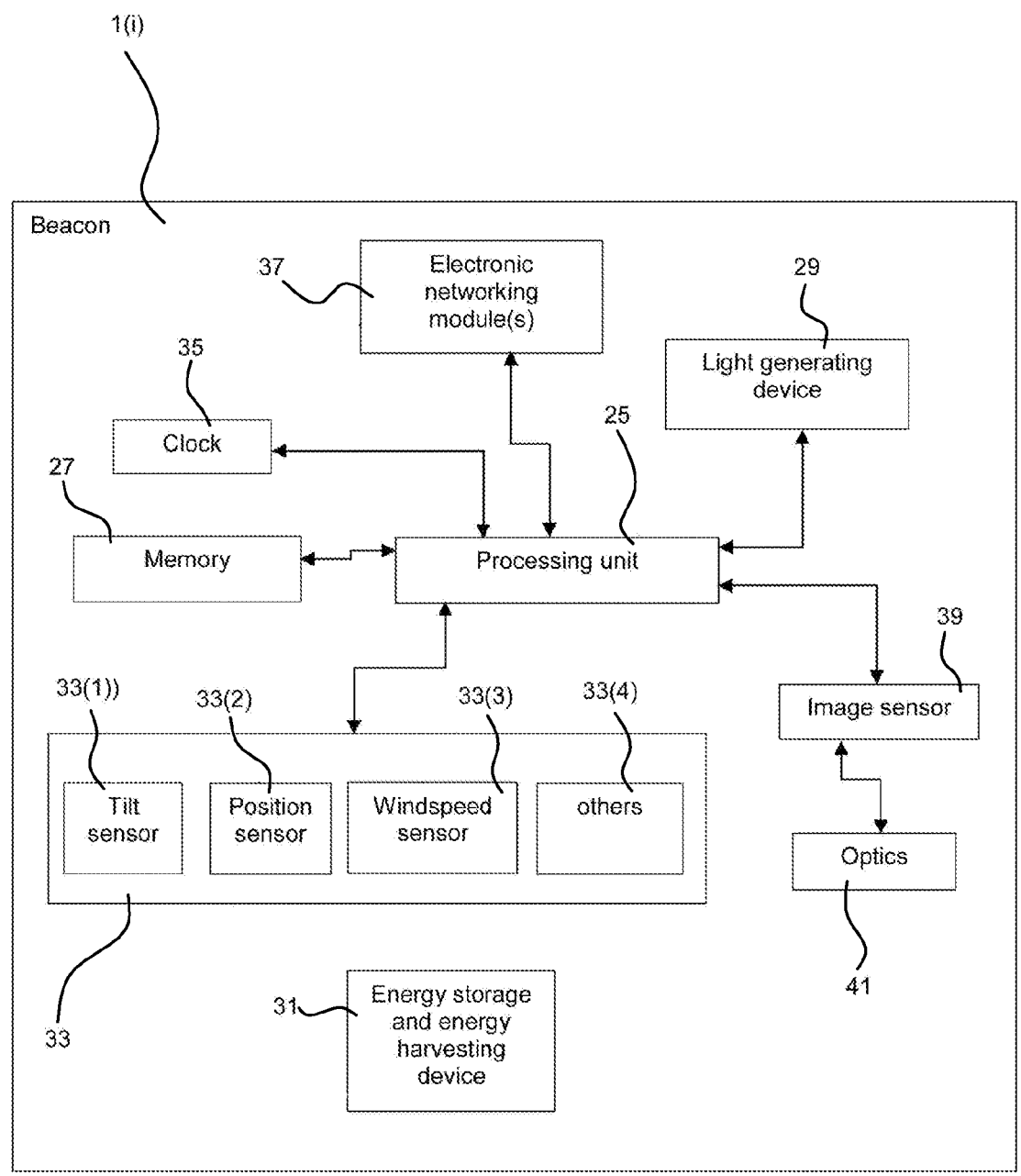
Figure 4:
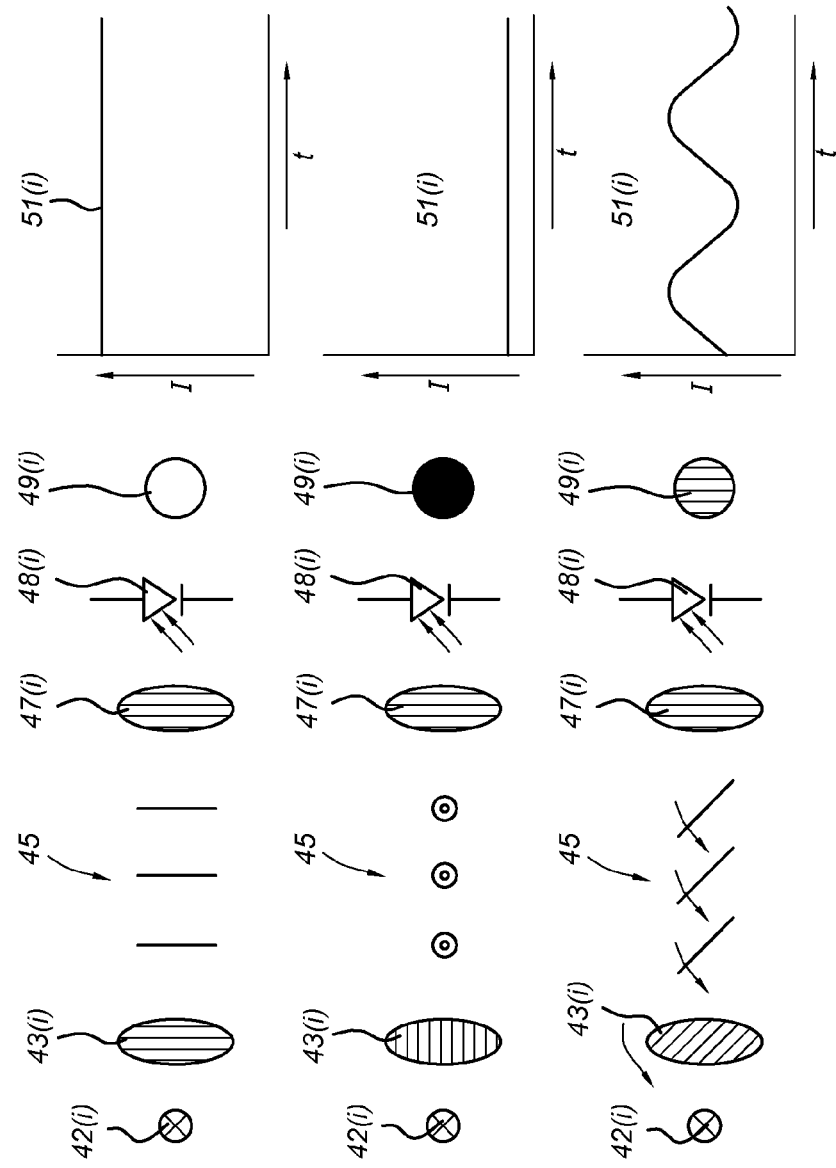
Figure 5:
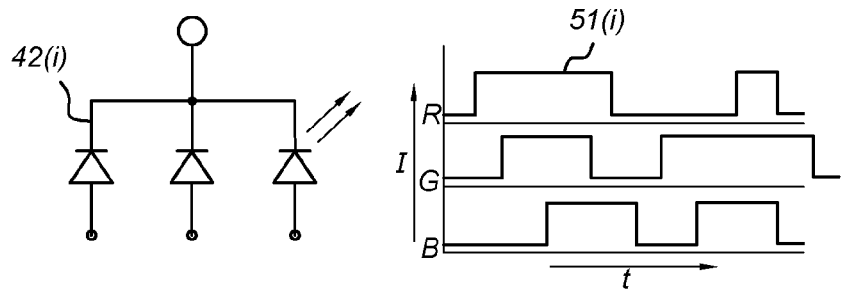
Figure 6:
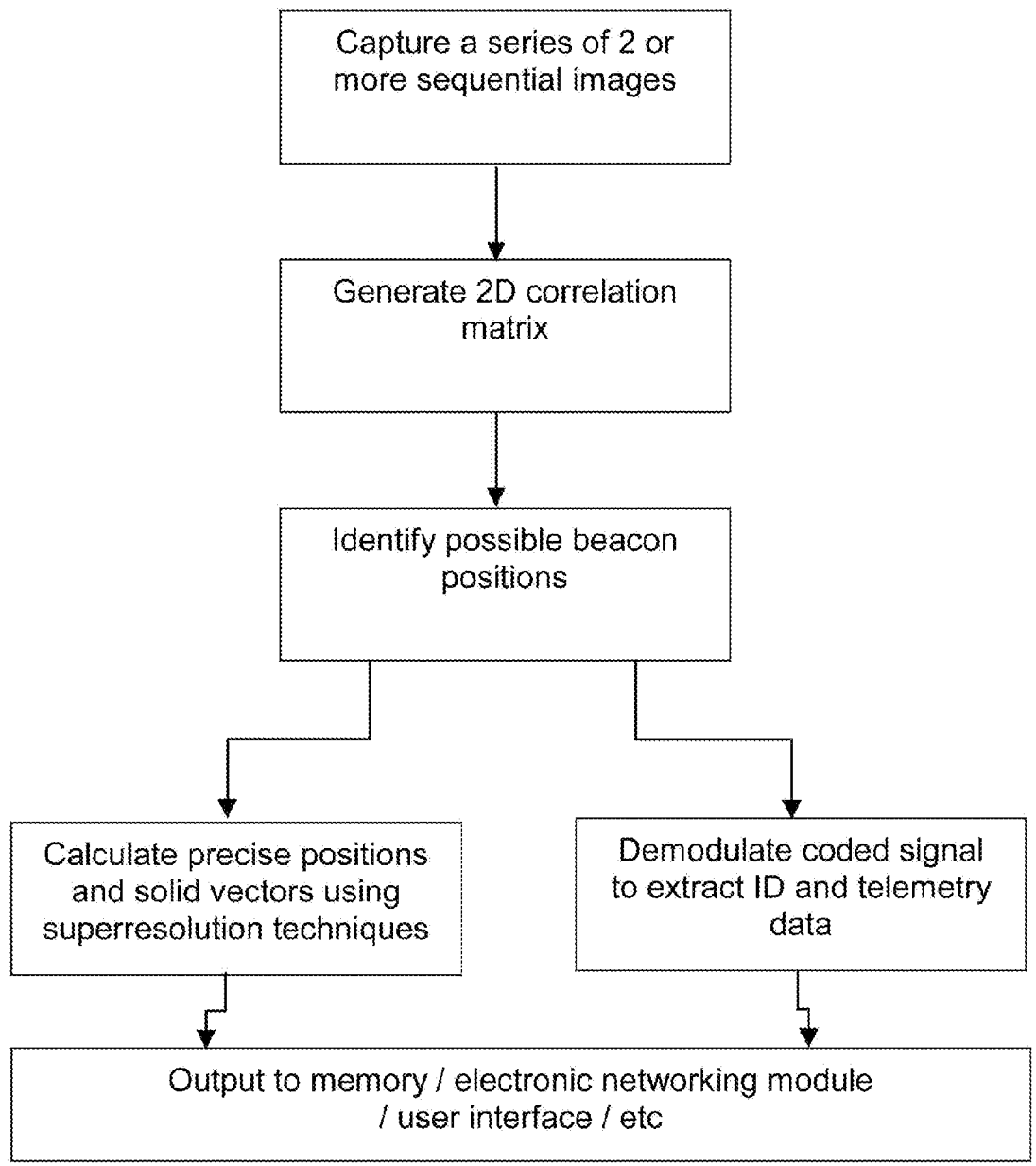

The present invention will be discussed in more detail below, with reference to the attached drawings, in which:

FIGS. 1a-1f depict several schematic setups of a system for monitoring a position and/or movement of an object;

FIG. 2 depicts a functional overview of a camera that can be used in the present invention;

FIG. 3 depicts a functional overview of a beacon that can be used in the present invention;

FIG. 4 shows a schematic diagram of a setup arranged to modulate light polarization;

FIG. 5 shows how color code modulation can be achieved with multi-color LEDs; and FIG. 6 shows a flow chart of an example of the functioning of the system.

DESCRIPTION OF EMBODIMENTS

The present invention tracks movement of objects by tracking one or more light sources ("beacons") attached to the object. The beacons are, preferably, discerned from other light sources by using correlation techniques. For this means it is important the beacon has a predetermined light pattern. This will be explained in detail below.

FIG. 1a shows a possible setup of a system in which an object 3 is monitored. The system comprises an apparatus, like a camera 7. The system also comprises one or more beacons 1(i), i=1, 2, 3, . . . , I which are attached to object 3. The object 3 is shown as comprising one or more buildings to which the beacons 1(i) are fixed. However, the object 3 may alternatively be any other construction like a tunnel (FIGS. 1b, 1c and 1e), a tower (FIG. 1d), a bridge (FIG. 1f), but also a vehicle (like a boat on land), etc. However, object 3 may also be a natural object like a big rock.

One camera 7 is shown. However, the system may comprise more than one camera 7. The invention will be explained with reference to one camera 7.

The beacons 1(i) are arranged to generate and transmit light beams 5(i) to the camera 7. The camera 7 may be arranged to generate and transmit one or more light beams 6(i) to the respective beacons 1(i).

FIGS. 1b and 1c relate to a tunnel. FIG. 1c is a top view of FIG. 1b. They show two tunnel segments 4, e.g. made of concrete. These tunnel segments 4 are separated by a water sealing rubber seal 6 which is fixed to, preferably, one of the opposing tunnel segments 4. The opening between both tunnel segments 4 is, at one or both outsides, sealed with a top seal 2 attached to both tunnel segments 4. Here, the beacons 1(i) are implemented as a beacon box 8 coupled to several optical fibres with optical fibre end points. Each one of them is transmitting a light beam 5(i) towards camera 7 as controlled by beacon box 8 which is controlled by a suitable processing unit 25 (cf. FIG. 3). Alternatively, individual beacons 1(i) can be implemented as explained with reference of FIG. 3.

Figure 1D:
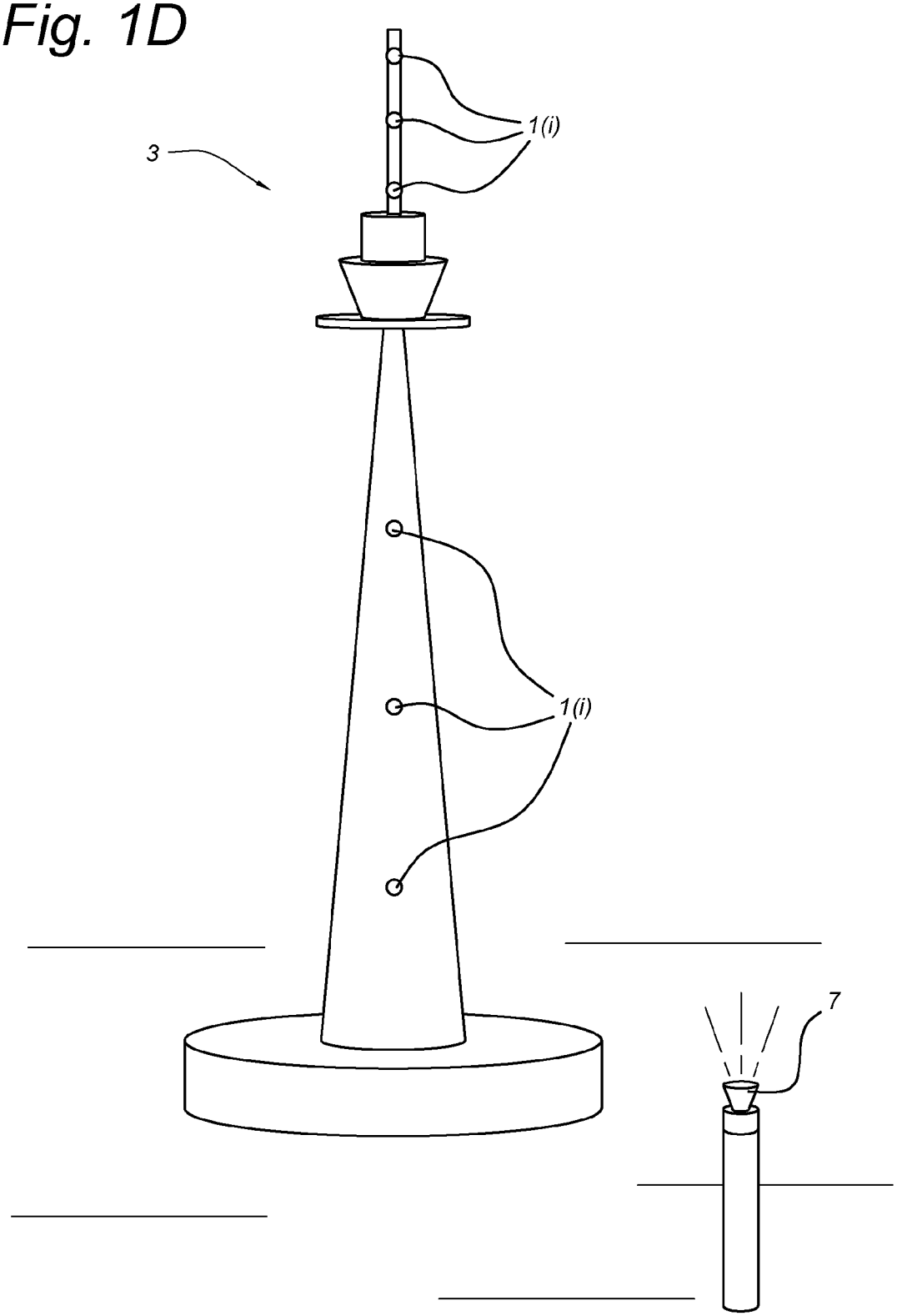

FIG. 1d shows a tower 3 having several beacons 1(i) attached to it. Camera 7 is arranged to view all beacons 1(i). The beacons may be installed in accordance with internal rules for obstacle warning strobes for e.g. airplanes.

Figure 1E:
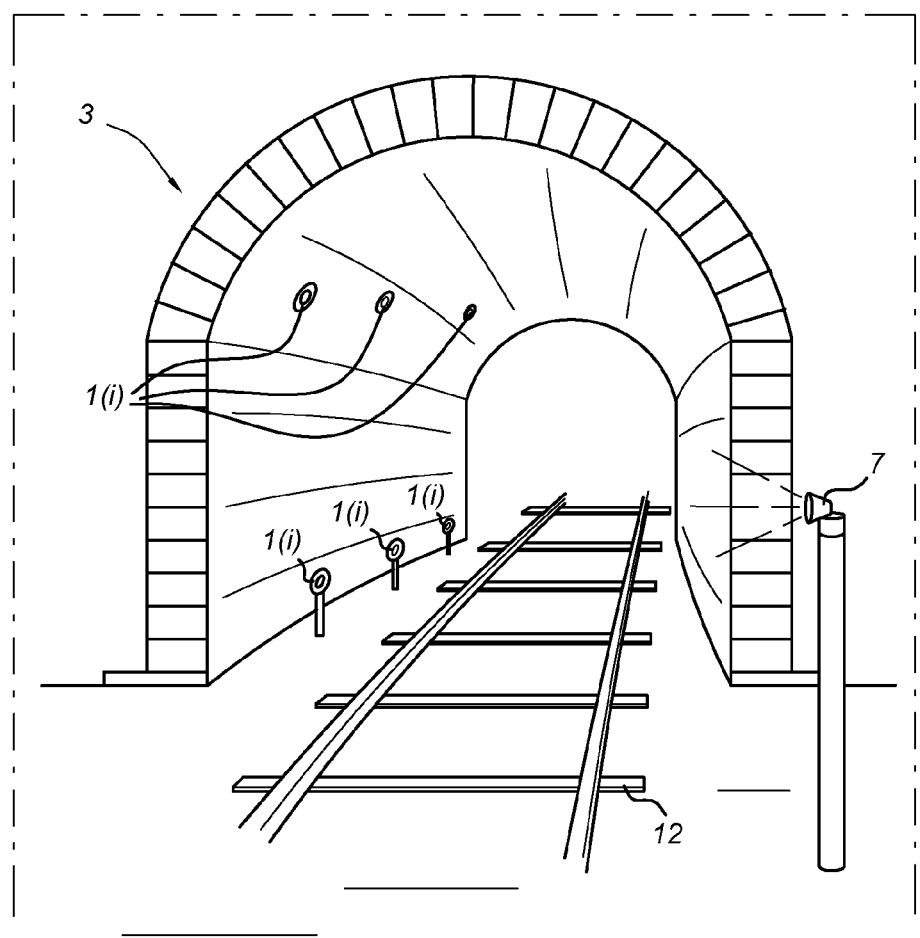
Figure 1F:
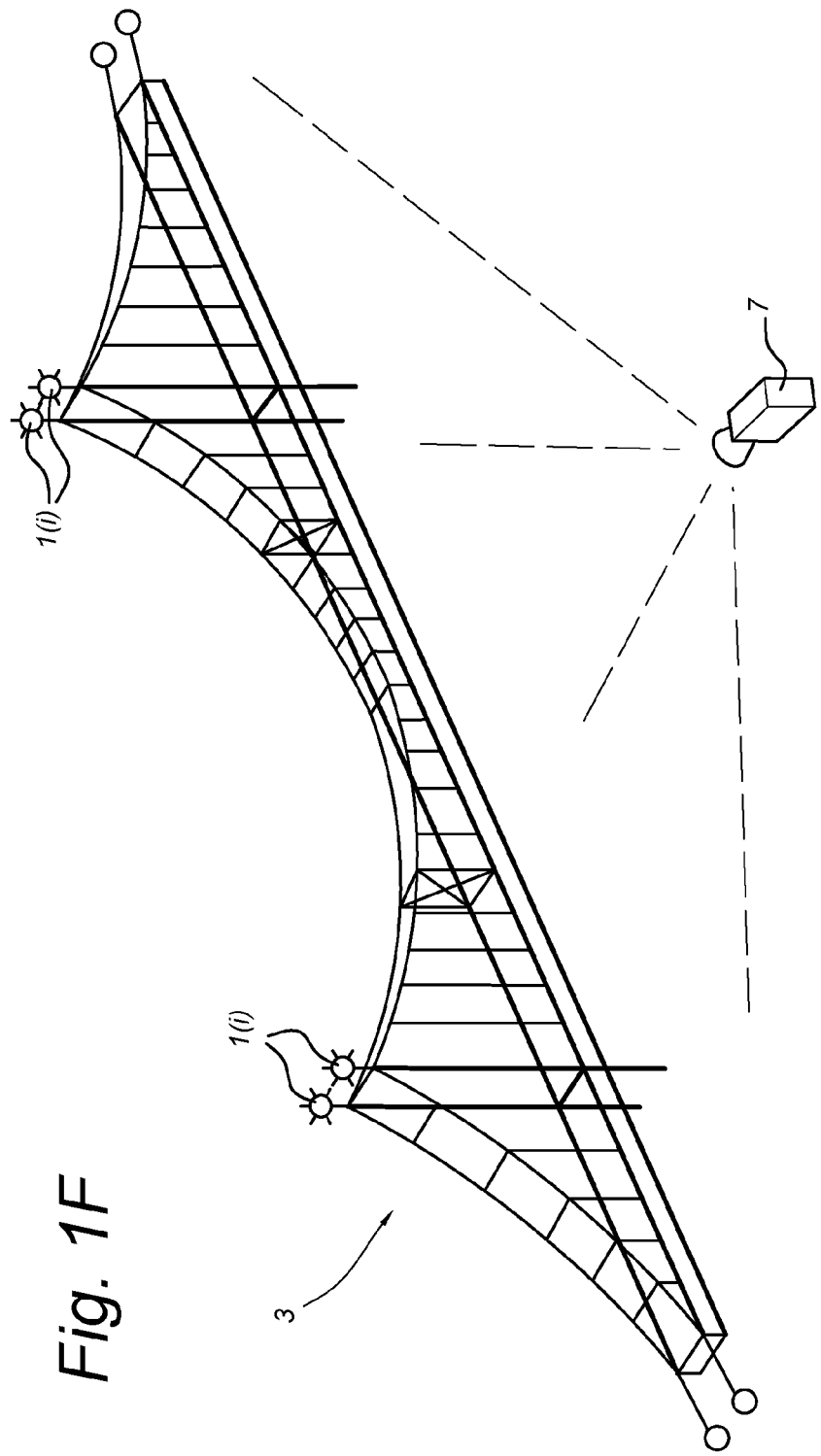

FIG. 1e show an implementation in a tunnel 3. A railway with railway sleepers 12 runs through the tunnel 3. Both the tunnel wall and the railway sleepers 12 are provided with beacons 1(i). Camera 7 is arranged to view all beacons 1(i).

FIG. 1 show an implementation on a bridge 3. The bridge 3 is provided with beacons 1(i). Camera 7 is arranged to view all beacons 1(i).

Camera

Now, the components of camera 7 will be described in more detail.

FIG. 2 shows an example of a camera 7. The example camera 7 has a processing unit 9 which is connected to a lens system 13, a light detector 11, a clock 23, a memory 15, one or more position and/or orientation measurement components 16, an output unit 17, an input unit (or user interface) 19, electronic networking module(s) 20, and a light generating device 21. The lens system 13 is shown to be connected to the light detector 11. This latter "connection" need not be a physical connection. Here, "connection" is intended to refer to a situation where the lens system 13 is arranged to receive ambient light and focus the received ambient light onto the light detector 11. The light generating device 21 is shown to be "connected" to the lens system 13 too. Again, this latter "connection" need not be a physical connection. Here, "connection" is intended to refer to a situation where the lens system 13 is arranged to receive light from the light generating device 21 and transmit such received light, preferably after suitable focussing, as one or more output light beams 6(i) to the beacons 1(i). the lens system may comprise one or more lenses. Not all functional elements shown in FIG. 2 need be present as will be apparent from the following description and claims.

All connections intended for transmission of data may be physical connections (wires) however, alternatively they may be wireless and based on transmission of electromagnetic/light radiation.

The processing unit 9 may be any suitable processing unit known from the art.

The lens system 13 is arranged such that it receives light beams 5(i) from the beacons 1(i) and focuses them on the light detector 11. It may also be arranged to receive light generated by light generating device 21 and to transmit it, possibly after focussing, towards one or more beacons 1(i). The light detector 11 preferably comprises a set of light sensitive elements (pixel) arranged in a 2D matrix forming a camera's image plane, like a CCD-sensor or a CMOS-sensor. The light detector 11 is arranged to receive the light beams 5(i) as focussed by the lens system 13. Each light beam 5(i) will be focussed on a subset of these light sensitive elements. Each such subset corresponds to a solid angle of one incoming light beam 5(i), i.e., both an angle of incidence in a horizontal and an angle of incidence in a vertical plane relative to the earth. Angles of incidence can, of course, also be measured relative to another object than the earth, like a geostationary satellite. As long as both the camera 7 and the beacons 1(i) remain at fixed positions, these subsets are static per beacon 1(i).

If the system is equipped with two or more cameras, the technology as described here can be used to measure how far the beacons 1(i) are from the cameras. This can be done by known triangulation measurements. Measuring a distance between camera 7 and the beacons 1 (i) can also be done with other distance measuring techniques like time-of-flight measurements.

The lens system 13 can be a wide angle lens system, a half-sky lens, a 360 degrees lens, a telelens or any other suitable imaging lens. The lens system 13 can optionally be provided with one of more optical filters, whereby such fillers can be one of optical low-pass filter, optical band-pass filter, optical high-pass filter, polarization filter, color filter, dichroitic filter, and neutral density filter.

The light detector 11 converts the received light beams 5(i) into an image. The image is a set of electronic signals, here called pixel signal. Each pixel signal is generated by one light sensitive element and has a value depending on the light intensity of light received by the light sensitive element. Thus, the pixel signals may also relate to the object 3 to which the beacons 1(i) are attached and its surroundings.

The light detector 11 is, preferably, positioned such that its light sensitive elements are in the vicinity of the focal plane of the lens system 13. In another preferred embodiment, the light detector 11 is positioned at a position within the focal distance of the lens system 13 such that the image is de-focused to a certain amount, resulting in a beyond infinity focus condition. In such an embodiment, the image processing may include super-resolution imaging based on defocusing techniques, thereby enabling sub-pixel resolutions. A resolution of $1/100$ or even better of a pixel can then be obtained.

The processing unit 9 is arranged to receive the pixel signals from the light detector 11 and store them in memory 15. The pixel signals may be stored by processing unit 9 as a single picture, preferably with a time stamp and/or position stamp indicating the position of camera 7. However, preferably, the pixel signal are stored by processing unit 9 as a series of pictures together forming a video, in which each picture is provided with a time stamp and/or position stamp indicating the position of camera 7.

Clock 23 provides clock signals to processing unit 9, as known to a person skilled in the art. The clock signals are used for the normal processing of processing unit 9. Processing unit 9 may base the time stamp on these clock signals. However, camera 7 may also be equipped with a GPS unit receiving time signals from a satellite or may receive time signals from another suitable source.

Memory 15 may comprise different types of sub-memories, like ROM (Read Only Memory) types of memory storing suitable program instructions and data to run the processing unit 9. Also, memory will comprise suitable RAM (Random Access Memory) types of memory for storing temporary data like the data received from light detector 11. Memory 15 may also comprise cache type memory. Some or all of the sub-memories may be physically located remote from the other components. Processing unit 9 may also be arranged to send all pixel signals to a remote unit via electronic networking module(s) 20 for external storage and processing. A local copy of these pixel signals may then, but need not be, stored in a local memory 15 within camera 7.

Memory 15 stores initial position data indicating the initial position of camera 7. Such initial position data may have been established by using a theodolite and then be stored by a user. Such initial position data can also result from a measurement made by the camera 7 itself. E.g., the camera 7 can collect consecutive pictures from known "blinking" light sources installed on tall air traffic obstacle markers having well known locations. Such obstacle markers may be placed in defined vertical distances on tall structures and thereby allow for triangulation (cf. FIG. 1c). Memory 15 also stores a camera ID identifying camera 7 and being used by processing unit 9 in external communications with other devices to identify itself to those other external devices.

Position and/or orientation measurement components 16 may include one or more accelerometers and/or gyrometers/gyroscopes, as is known to a person skilled in the art. They may also include the above mentioned GPS unit. Such accelerometers and/or gyrometers/gyroscopes measure the camera's own motion and derive an updated camera position and orientation from such measurements. The updated camera position and/or orientation is then stored by processing unit 9 in memory 15. By doing so, changing camera positions and/or orientations can be taken into account when measuring the position of the one or more beacons 1(i). accuracy may be in the order of a few $1/1000$ degrees and about 3 cm (on land) or 4 cm (on sea). Tests have shown 2 milli degrees peak-to-peak.

Output unit 17 may comprises one or more sub-output-units, like a display and a speaker.

Input unit 19 may comprise one or more sub-input-units like a keyboard and a microphone. The display and keyboard may be made as two distinct touch screens, however, they may also be implemented as a single touch screen.

Electronic networking modules 20 may comprise one or more of LTE (Long Term Evolution), Ethernet, WiFi, Bluetooth, Powerline communication, Low Power Wide Area Network (e.g. Lora™ and Sigfox™), IoT (Internet of Things) and NFC (Near Field Communication) modules.

The light generating device 21 comprises at least one light source like a Light Emitting Diode (LED) source configured to generate light. Processing unit 9 is arranged to control each LED source such that they generate a light beam. The LED sources transmit them to lens system 13 which transforms them to become light beams 6(i). Alternatively, the light generating device 21 comprises at least one of VCSELs (Vertical-Cavity Surface-Emitting Laser), EELs (Edge Emitting Laser), incandescent light bulb, fluorescent light sources, quantum dots, and light converting elements.

The light emitting power and size of the beacons 1(i) can be adapted to the circumstances and environment. Should the system be employed in confined environments, such as tunnels, cavities, crevasses, crevices maintenance shafts, etc., the beacons 1(i) may be small such as to accommodate as little space as possible.

Beacons

Now, exemplary beacons 1(i) will be described in more detail.

The beacons 1(i) are arranged to transmit light beams 5(i) towards the camera 7. They may be configured as passive mirrors reflecting light beams 6(i) as generated by the camera 7 and produce reflected light beams 5(i), which reflected light beams 5(i) are then received and properly processed by camera 7.

Alternatively, such beacons 1(i) may be existing light sources already mounted onto objects. For example, light houses or other maritime reference points transmit a predetermined series of light flashes controlled by the international association of lighthouse authorities (IALA) Another example are SIGNI navigation lights, as well as the obstruction markings and lightings mounted on tall structures to alert air traffic. These latter markings and lightings are controlled by the FAA in the US and similar authorities in other nations. Yet another example are traffic alert system like warning lights, traffic lights or matrix information signs.

As a further alternative, the beacons 1(*i*) can be formed by ends of optical wave guides, such as optical fibers, thereby allowing the light source in a remote location for further miniaturization. In such embodiments, the beacons 1(*i*) can be fit into very small spaces.

However, here, the beacons 1(*i*) are presented and explained as active beacons. FIG. 3 shows an example of a beacon 1(*i*). The example beacon 1(*i*) is shown to be a "smart" beacon. I.e., the beacon 1(*i*) comprises a processing unit 25 connected to an energy storage and energy harvesting device 31, a set of sensors 33, a memory 27, a clock 35, a light generating device 29, one or more electronic networking modules 37, an image sensor 39, and optics 41. The set of sensors 33 may comprise a tilt sensor 33(1), a position sensor 33(2), a wind speed sensor 33(3) and other sensors 33(4). Electronic networking modules 37 may comprise one or more of Ethernet, WiFi, Bluetooth, Powerline communication and NFC (Near Field Communication) modules.

Smart beacons 1(*i*) can also be provided with environmental sensors such as gas sensors, accelerometers, temperature sensors, anemometers, air pressure sensors, light sensors, moisture sensors, fine particle sensors, magnetometers, radiation sensors, etc.

All connections intended for transmission of data may be physical connections (wires) however, alternatively they may be wireless and based on transmission of electromagnetic/light radiation.

The processing unit 25 may be any suitable processing unit known from the art.

The energy storage and energy harvesting device 31, in its most simple embodiment, comprises a battery arranged to feed electrical energy to all other components in beacon 1(*i*) via suitable wires (not shown). Alternatively, there may be a connection to the mains or other energy source but that may be impracticable in many situations. The energy storage and energy harvesting device 31 may comprise a rechargeable battery and means to generate electrical energy to recharge the rechargeable battery, like a small solar panel, wind mill, fuel cell, etc.

Clock 35 provides clock signals to processing unit 25, as known to a person skilled in the art. The clock signals are used for the normal processing of processing unit 25. Processing unit 25 may base a time stamp on these clock signals.

Memory 27 may comprise different types of sub-memories, like ROM (Read Only Memory) types of memory storing suitable program instructions and data to run the processing unit 25. Also, memory 27 will comprise suitable RAM (Random Access Memory) types of memory for storing temporary data like data received via optics 41 and image sensor 39. Memory 27 may also comprise cache type memory. Processing unit 25 may also be arranged to send such sensor signals to a remote unit via electronic networking module 37 for external storage and processing. A local copy of these sensor signals may then, but need not be, stored in local memory 27 within beacon 1(*i*).

Memory 27 may store initial position data indicating the initial position of beacon 1(*i*). Such initial position data may have been established by using a theodolite and then be stored by a user. The user may have sent such initial position data to the processing unit 25 e.g. via the electronic networking module(s) 37.

Memory 27 may also store a beacon ID identifying beacon 1(*i*) and being used by processing unit 25 in external communications with other devices to identify itself to those other external devices.

Position sensor 33(1) and tilt sensor 33(2) may include one or more accelerometers and/or gyrometers/gyroscopes, as is known to a person skilled in the art. Such accelerometers and/or gyrometers/gyroscopes measure the beacon's own motion and derive an updated beacon position and orientation from such measurements. The updated beacon position and/or orientation is then stored by processing unit 25 in memory 27.

The light generating device 29 comprises at least one light source like a Light Emitting Diode (LED) source configured to generate light. Processing unit 25 is arranged to control such LED source such that it generates light beam 6(*i*). Alternatively, the light generating device 29 comprises at least one of a VCSEL (Vertical-Cavity Surface-Emitting Laser), an EEL (Energy Efficient Lighting), incandescent light bulb, fluorescent light source, and light converting element.

Beacon 1(*i*) may be provided with optics 41 like a suitable simple lens arranged to receive ambient light and transfer such received light, preferably by properly focusing to image sensor 39. Such image sensor 39 may be simple light sensor which converts received light into a sensor signal for processing unit 25 which stores the sensor signal in memory 27. This setup allows for beacons 1(*i*) also acting as measurement devices. Further, in such an embodiment, several beacons 1(*i*) together can form a mesh network.

The beacons 1(*i*) are, preferably, arranged to transmit a special light pattern of flashes that contains embedded telemetry data. To this means, the light pattern may be modified or modulated to encode the embedded telemetry data. Even though the embedded telemetry data and thus the exact light pattern is not known beforehand by the receiver (camera 7), the light pattern still contains enough predetermined elements so that the camera 7 can use correlation techniques to discern the beacon's light pattern from other light sources. This will be explained in further detail hereinafter.

There are multitude of methods to embed telemetry data in such a light pattern. One method is modulation, including any form of amplitude, frequency and phase modulation. Common examples of modulation are PSK (phase shift keying), FSK (frequency shift keying), ASK (amplitude shift keying), QAM (quadrature amplitude modulation). These methods all employ a fixed "carrier" frequency that is easily detected by the receiver (camera 7). Another method is using spread spectrum techniques like code division multiple access.

Light polarization can be modulated by moving filters or filter wheels. Light polarization can further be modulated by electro-optic modulators, such as Pockels cells. Beacons modulated with polarization will have the advantage that the modulation is essentially invisible to the unaided human eye.

Color coded modulation can be achieved with multi-color LEDs. The detection of such color modulated beacons can be achieved by reading out the individual color channels of a color image sensor, such as an image sensor provided with a Bayer CFA (color filter array), or any equivalent color image sensors.

Modulated Light

Now some more details as to modulation will be provided.

The light generation devices 21 and 29 can be arranged to modulate their output light beams such that they carry additional information. As shown in FIG. 4 this can be achieved by modulating light polarization by moving filters or filter wheels. FIG. 4, in its upper part, shows a light source 42($i$), a rotatable linear polarizer 43($i$), a static linear polarizer 47($i$), and a photo diode 48($i$). The rotatable, linear polarizer 43($i$) is arranged such that it receives light as emitted by light source 42($i$) and transmits linearly polarized light 45. The static linear polarizer 47($i$) receives the polarized light 45 and transmits an amount of light to photo diode 48($i$). The amount of light depends on the orientation of the static linear polarizer 47($i$) relative to the orientation of the polarized light 45, as is known to persons skilled in the art. As shown in the upper part of FIG. 4, the rotatable linear polarizer 43($i$) is arranged such that the orientation of the polarized light 45 100% matches the orientation of the static linear polarizer 47($i$) such that a maximum amount of light is transmitted to photo diode 48($i$), as indicated by a white circle 49($i$). This maximum amount of light is transferred into a maximum current by photo diode 48($i$). This is schematically indicated by curve 51($i$). as long as the orientation of rotatable linear polarizer 43($i$) remains in this position, current 51($i$) will remain at this maximum level.

The middle part of FIG. 4 shows a situation where the rotatable linear polarizer 43($i$) is rotated by π/2 (or any odd multiplication thereof). In such a case, as the person skilled in the art will know, polarized light 45 will be oriented such relative to static linear polarizer 47($i$) that no (or a minimal) amount of light 49($i$) will be transmitted by static linear polarizer 47($i$), as indicated with a black circle. So, the current produced by photo diode 48($i$) will also be minimal as indicated by curve 51($i$).

The processing unit 9 of camera 7 and/or processing unit 25 of beacon 1($i$) is arranged to control the rotation of the rotatable linear polarizer 43($i$). It can be arranged to control rotation of the rotatable linear polarizer 43($i$) such that it changes abruptly from the orientation shown in the upper part of FIG. 4 to the middle part of FIG. 4. Then, the output current of photo diode 48($i$) shows a square wave pattern in which the current 51($i$) switches between a maximum (upper part) and minimum (middle part) value. However, the processing unit 9, 25 can be programmed to control rotation of rotatable linear polarizer 43($i$) such that a changing current value 51($i$) is produced in any desired form, e.g. saw tooth or sine wave shape, as shown in the lower part of FIG. 4.

Of course, alternative setups can easily be designed. E.g. the rotatable linear polarizer 43($i$) and static linear polarizer 47($i$) can change positions.

As an alternative, light polarization can be modulated by electro-optic modulators, such as Pockels cells. Beacons modulated with polarization will have the advantage that the modulation is essentially invisible to the unaided human eye.

In an embodiment, color code modulation is applied. Color coded modulation can be achieved with multi-color LEDs, as shown in FIG. 5. FIG. 5 shows, as an example, that light source 42($i$) is made of three separate LEDs, e.g. a red light, green light and blue light emitting LED. On the right hand side, an example of light output signals of these three LEDs as a function of time t is shown. Processing unit 9, 25 is arranged to control these individual color LEDs such that they emit light in accordance with a controlled time schedule. All these light colors can be modulated such that a certain total output color is generated. While the diagram show on/off modulation only, multi-color LEDs will also allow for brightness variation in the individual colors, thereby offering the option of further modulating the respectively color light beam with a carrier, which in itself can be modulated, e.g. by PSK. An advantage of multi-color modulation is that with every additional wavelength, additional bandwidth is made available for data communication.

The detection of such color modulated beacons can be achieved by reading out the individual color channels of an color image sensor, such as an image sensor provided with a Bayer CFA (color filter array), or any equivalent color image sensors.

Functionality

The basic idea is that camera 7 is arranged on a fixed position such that it is static. Then, the static position is known and stored in memory 15 accessible by processing unit 9 in camera 7.

When all beacons 1($i$) have been installed they have an initial position which may be stored in their own memory 27 and in camera's memory 15. Such beacons initial position data may have been stored in memory 15 by manually inputting such data into the camera 7 via input unit 19. Alternatively, a user may have sent such data to camera 7 via the electronic networking module 20, either via a wire-connection or a wireless connection. As a further alternative, the beacons 1($i$) may be smart such they can send their own stored initial position data to the camera 7, e.g. via their electronic networking module 37.

Thus, when the system starts, camera 7 knows all initial positions of beacons 1($i$) which correspond to an initial position and orientation of object 3 to which the beacons 1($i$) are attached.

Processing unit 25 of each beacon 1($i$) executes a stored program from memory 27 that instructs the processing unit 25 to control light generating device 29 to generate a light beam 6($i$) transmitted to camera 7. Light beam 6($i$), preferably, has the form of a series of consecutive pulse shaped light signals where each one of them has an amplitude controlled by processing unit 25. Over time, e.g., the amplitudes of consecutive pulses may be such that the series shows a sine wave pattern. Each one of the beacons 1($i$) may have its own characteristic sine wave frequency such that the frequency is an ID for each distinct beacon 1($i$). Camera 7 can easily detect such wave frequency and, by doing so, identify from which beacon 1($i$) it receives a certain light beam 6($i$). Camera 7 receives consecutive images from light detector 11 and stores them in memory 15. These consecutive images form a video containing data relating to the consecutive pulses of all individual light beams 6($i$).

The processing unit 9 is arranged to calculate an initial solid angle of incidence of each of the consecutive pulses of each light beam 6($i$). I.e., each received consecutive pulse is focused by lens system 13 on one or more light sensitive elements of light detector 11. Processing unit 9 determines which one these light sensitive elements are and then establishes the solid angle of incidence of the corresponding light pulse. techniques to do so are known to persons skilled in the art and need no further detailed explanation here.

When the object 3 is stable, i.e., does not move, the positions of all beacons 1($i$) is also stable. Consequently, the solid angle of incidence of each light pulse on the camera's light detector 11 is fixed. However, as soon as the object 3 moves, or parts thereof, this solid angle of incidence of the consecutive pulses of one or more light beams 6($i$) changes. The processing unit 9 is arranged to calculate this change of the solid angle per light beam 6($i$).

FIG. 6 shows an example of consecutive steps in the method of the invention.

The camera system 7 receives the light beams 5($i$) from a beacons 1($i$) that is projected onto the light detector 11 by lens system 13. FIG. 6 depicts what the flow of processes, performed by processing unit 9, is to extract all relevant beacon data.

The first step in the processing is to capture at least two, but preferably many images in a sequential order. Each image is essentially a 2D array of light values. By capturing a sequence of images, a 3D matrix of light values is formed. The axes in the 3D matrix are X, Y and time T. In one embodiment a sequence of 100 images are captured with an interval of 1/60 s.

The sequence of images are correlated with one or more predetermined patterns stored in memory 15. This process produces one or more 2D correlation matrices. Each X/Y coordinate in these correlation matrices correspond to the X/Y pixel locations in the original sequence of images.

The value of each X/Y coordinate in a correlation matrix is a measure of the correlation of the light pattern received at that X/Y location and the predetermined pattern stored in the memory 15. A high value at an X/Y position in the correlation matrix corresponds to a large correlation (e.g., the received light ray at that X/Y location behaves like the predetermined pattern). A low value at an X/Y position in the correlation matrix corresponds to a low correlation (e.g., the received light ray at that X/Y location does not behave like the predetermined pattern).

The beacons $1(i)$ transmit a pattern that correlates well with the predetermined pattern(s) stored in memory 15. Therefore, each X/Y location in the original sequence of images that received light beam $5(i)$ from a beacon $1(i)$ will produce a high value in the X/Y location of the resulting correlation matrix. Background light like static light (sunlight, street lighting, lighted signs, etc, etc) or moving lights (like car head lamps, airplanes, light reflection in water ripple, etc, etc) will not correlate well and thus produce low values in the correlation matrix. Other modulated light sources that transmit light with a pattern different from the predetermined pattern will also produce low values in the correlation matrix. The resulting correlation matrix is thus a "map" of candidate beacon locations.

In one embodiment, the beacons $1(i)$ transmit a sinusoidal light pattern with a fixed frequency of e.g. 7.5 Hz (other values are, of course, possible). To generate the correlation matrix Cm(amplitude) the following correlation method could be used:

$$Cm(\text{inphase}) = \sum_0^i \sin\left(\frac{2\pi}{60} \cdot 7.5 \cdot i\right) \cdot \text{image}_i$$

$$Cm(\text{quadrature phase}) = \sum_0^i \cos\left(\frac{2\pi}{60} \cdot 7.5 \cdot i\right) \cdot \text{image}_i$$

$$Cm(\text{amplitude}) = \sqrt{Cm(\text{inphase})^2 + Cm(\text{quadrature phase})^2}$$

The sequence of images is correlated with the 7.5 Hz fixed frequency sinusoidal predetermined pattern in formula (1) and (2). A person skilled in the art would recognize that by correlation with both the sine and the cosine version of the sinusoidal pattern, phase differences between the beacon and the camera system are accounted for. By calculating the modulo of the vector formed by the in-phase and quadrature phase components a correlation matrix Cm(amplitude) is calculated. In this particular embodiment the correlation matrix Cm is calculated over a large number of images thus yielding a very high signal to noise ratio.

The resulting correlation matrix is examined for candidate beacons by means of a simple threshold. All pixel locations with a value higher than the threshold value are considered candidate beacon locations.

In another embodiment an out of focus lens system is used for reasons explained further. This produces an airy disk spanning a large number of pixels for each received light beam $5(i)$. Because the energy is smeared over several pixels, the correlation value of the pixel location may fall below the threshold value. In that case, an additional processing step may be added: by down sampling the correlation matrix to a lower resolution, the signal to noise ratio is increased considerably allowing the use of a lower threshold to detect candidate beacon locations.

For each candidate beacon location the precise angle from which the light ray originates must be calculated. In one embodiment, a lens system 13 with an horizontal FOV (field of view) of 60 degrees is used that projects light on a light sensor 11 with a horizontal resolution of 1920 pixels.

The resulting angular resolution is thus 60°/1920px=0.03° per pixel. To further improve the resolution, subpixel resolution is needed. The subpixel location of the beacon is then computed by determining the "center of gravity" of the beacon image over all the pixels forming the image. To further aid in this process, lens system 13 can be deliberately aligned such that the projected image on sensor 11 is out of focus thus creating a large unfocussed light disk. Alternatively, a small aperture could be used to create diffraction. This produces an Airy disk spanning a large number of pixels. Such an embodiment has the advantage of increasing the depth of field such that beacons close by and far away produce similar sized projections.

Optionally, each candidate beacon location is examined for the embedded telemetry data by demodulating the light signal in the sequence of images. When the beacon is a smart beacon containing telemetry data this data is extracted and can be used to accept or reject the candidate beacon. When no telemetry data is found the light comes from an alternative light marker such as known light signatures of warning and/or navigation lights or strobes. In the latter case, such a beacon can be accepted or rejected upon further examination.

Applications

Now some possible applications of the above described system will be explained.

1. Earthquake Monitoring

Groningen, a province in the Netherlands, is suffering from frequent earthquakes of varying intensity, causing structural damage to a large number of buildings and perhaps also plants and civil infrastructure. The above described monitoring system and method are able to capture vibrations and displacements of any part of a structure in its field of view, at very low cost and allow for automated processing and analysis. This is believed to provide objective observation material, which can be used in damage assessment and/or safety analysis. The cameras could be fitted with 6DOF motion sensors to be able to subtract the camera motion due to the quake. The permanently fitted cameras would be configured to continuously record data locally i.e. using a circular buffer of a day or so. If an earthquake happened, the data will be automatically downloaded to the cloud using a 4G wireless connection, where the data is automatically processed and analysed. The system could automatically detect points of interest that need attention. Observers would then be able to look at the data and the analysis through a web portal. This portal could i.e. provide an image of the object where points of interest are highlighted. By clicking on a point of interest, it would then visualize a motion magnified movie of what happened during the earthquake. If necessary, multiple cameras observing the same object from different angles, could provide 3D vibration and displacement vectors.

The hardware could consist of a wide angle camera, a processor and storage device, a MEMs motion sensor, 4G connectivity, and a power supply (if required with solar cells, if no power is available).

2. Asset Integrity Monitoring in Oil Refineries

Refineries contain hundreds of kilometres of pipes, thousands of pumps, many distillation columns, storage tanks and flare stacks. Using existing technology, it is possible to provide accurate 3D snapshot overviews of these assets, but that does not detect hazards or potential hazards. It merely creates a 3D model of the assets at a certain time, and allows to detect changes to the structure (i.e. addition or removal of components).

The above explained system and method could provide the following additional information of any small or large object (i.e. pipes, rotary equipment, columns and tanks) in the field of view of the camera, by just fitting cameras observing the assets:
  Vibration analysis
  Sub mm displacement analysis
  Gas or fluid leak detection
  Fire or excessive heat detection
  NFRM analysis (detecting change in the natural resonant frequencies, which could be an indication of failure or imminent failure)
  Detecting whether a pump is running (so vibrating) or not, and how fast it runs (frequency).
  Detecting the amplitude of vibration through a pipe as an indication of the amount of turbulent flow.
  Measuring very low frequency displacements (temperature related expansion, contraction, or other) of a variety of objects (pipes, pumps, tanks etc)
  Measuring deformation of objects like tanks due to load (i.e storage of oil etc.)

The cameras would be fitted with 6DOF motion sensors to be able to subtract the camera motion due to wind etc. The cameras would be configured to continuously download image data to the cloud using a wireless connection, and automatically process and analyse the data. The system could automatically detect points of interest needing attention and, if necessary, generate alarms. An observer would be able to look at the data and the analysis through a web portal. This portal could i.e. provide an image of a part of the refinery, where points of interest are highlighted. By clicking on a point of interest, it would then visualize a motion magnified movie of what happened causing the alarm or what triggered the highlight. If necessary, multiple cameras observing the same object from different angles, could provide 3D vibration and displacement vectors and leak information.

The hardware could consist of a wide angle camera, a processor and storage device, a MEMs motion sensor, wireless radio modem (i.e WiFi), and a power supply.

3. Integrity Measurement of Fixed Offshore Production Platforms and Jack-Up Drilling Rigs An existing method to monitor integrity of fixed offshore production platforms and jack-up drilling rigs is to fit vibration sensors on the platform and perform NFRM (Natural frequency Resonance Monitoring) analysis to detect changes which could be an indication of failure or imminent failure.

This analysis however will be limited to the points where a sensor is fitted.

Using the above explained system and method however, a single camera could observe an almost unlimited number of points of interest (anything within the camera view, including flare stacks) and could perform the following measurements, most of which cannot be performed with a vibration sensor:
  Vibration analysis (including very low frequency)
  Displacement analysis
  Gas or fluid leak detection
  Excessive heat or fire detection.
  NFRM analysis (detecting change in the natural resonant frequencies, which could be an indication of failure or imminent failure.
  Detecting whether a pump is running (vibrating) or not, and perhaps even how fast it runs.
  Detecting the amplitude of vibration through a pipe as an indication of the amount of turbulent flow.
  Measuring very low frequency displacements (temperature related expansion, contraction, or other) of objects (pipes, pumps, tanks etc)
  Measuring deformation of objects like tanks due to load (i.e storage of fluid etc)

The cameras could be fitted with high grade 6DOF motion sensors to be able to subtract the camera motion, and also provide a vibration measurement local to the camera not depending on vision. The cameras would be configured to continuously or periodically download image data to the cloud using a wireless connection (to the platform internet connection), and automatically process and analyse the data. The system could automatically detect points of interest needing attention and if necessary generate alarms. The observer would be able to look at the data and the analysis through a web portal. This portal could i.e. provide an image of the platform, where points of interest are highlighted. By clicking on a point of interest, it would then visualize a motion magnified movie of what happened causing the alarm or triggering the highlight. If necessary, multiple cameras observing the same object from different angles, could provide 3D vibration and displacement vectors and leak information.

The hardware would consist of a wide angle camera, a processor and storage device, a MEMs motion sensor, wireless radio modem (i.e. WiFi), and a power supply.

4. Vortex Induced Vibration in Subsea Pipelines, Risers, Jumpers and Other Conductors ViV (Vortex induced Vibration) in subsea pipelines, risers, and conductors is a common threat to the integrity of the objects, due to the risk of fatigue induced failure. A common method to measure VIV is to fit a vibration sensor to the object. Fitting a sensor to a subsea structure however is a time-consuming process. The technology as described here would be able to measure VIV remotely by simply placing a camera at the seabed and observing the object from a (small) distance.

The system can perform the following measurements:
  Displacement and subsidence monitoring
  Vibration monitoring The ROV (Remotely Operated Vehicle) would deploy the units at some critical points around a subsea field to monitor a pipeline freespan or unsupported jumper. The ROV then carries on doing CVI surveys around the facilities.

At the end of the campaign the ROV picks up the camera units, downloads data, and recharges batteries ready to go to the next facility.

5. Dynamic Vessel Hull Shape and Stress Monitoring of FPSO's and Other Large Floating Structures The invention may also be applied in (FPSO=Floating Production, Storage and Offloading) Dynamic vessel hull shape and stress monitoring. FPSO's or other large floating structures are exposed to a lot of stress depending on load and the environment (wind, waves and current). Over time, these stresses can cause fatigue and failure, potentially leading to a catastrophic disaster and loss of lives. Current methods to monitor and measure these stresses are to fit strain gages at many points to the hull, and/or fitting precise satellite beacons at a number of locations on the structure. Precise pitch & roll sensors may also be used to derive differences in pitch and roll on different parts of the structure. These methods are all expensive to install, and still give a limited insight into the dynamic shape and stress of the hull.

The system and method as described here could be used to continuously measure and monitor the dynamic shape of the entire structure (visible within its field of view), at the mm level. One or more cameras could be fitted on high structures on the hull providing an overview of the structure below.

From these measurements, the stresses in the hull can be derived, which can be used for fatigue analysis.

Simultaneous measurement of weather information (wave height and direction, wind speed and direction, current and direction), could be used to correlate the hull dynamic behaviour to the environmental forces and the load it is carrying.

Continuous automated analysis on board (perhaps using machine learning techniques) could, over time, lead to a model where the dynamic behaviour of the hull for different weather conditions can be predicted. Observed differences between the predicted behaviour and the model could then indicate imminent failure and set off alarms.

The hardware for this set-up would be relatively simple: One or more cameras fitted on a high point on the structure, and a processing station would be sufficient.

6. Stress Monitoring of Heavy Lift and Transport Motion Monitoring.

Large structures are often assembled onshore, and transported to an offshore location. The lifting of these structures and its transport induce stresses in the structure that may need to be measured to monitor fatigue or measure the maximum stress the structure was exposed to during transport. The invention may be an elegant solution to perform these measurements as it does not require fitting sensors onto the structure. The invention may also be practical to measure stresses in the cranes performing these heavy lifts.

7. Windturbine Vibration Monitoring

The technology, presented here, may be of interest to measure vibrations in, possibly off shore, wind turbine structures. For this purpose, one may fit a MEMS 6DOF compensated camera on a number of wind turbines observing other wind turbines. The motion of the camera due to the turbine it is fitted on would have to be subtracted from the motion it measures.

The disclosed technology can also be used in indoor navigation systems, in which the beacons can be used to identify and mark a specific location. Said navigation systems can be use within buildings, tunnels, mines, or other environments in which conventional navigation methods are not useable.

The invention claimed is:

1. An apparatus monitoring positions on an external object having at least one attached beacon, the apparatus comprising:
   a lens system configured to projecting light on an image sensor and configured to receive at least one light beam transmitted from the at least one beacon and transfer the at least one light beam to the image sensor;
   the image sensor configured to form image data based on the received at least one light beam;
   a processing unit configured to communicate with a memory storing a computer program comprising instructions and data, when the computer program is executed by the processing unit, the processing unit is configured to:
   capture a series of sequential images, each image substantially being a two-dimensional array of light values;
   correlate the sequence of images with one or more predetermined patterns stored in the memory, thereby producing one or more two-dimensional correlation matrices;
   identify, based on one of Fourier transformation, correlation or autocorrelation, the at least one beacon within the image data based on a light signature of the at least one light beam,
   determine current location data of the at least one beacon based on the image data,
   compare the current location data with former location data of the at least one beacon as stored in the memory, and
   determine whether the object has moved relative to a fixed reference frame based on the comparison.

2. The apparatus according to claim 1, wherein the processing unit is configured to:
   calculate the current location data by calculating positions and solid vectors using subpixel resolution, wherein subpixel resolution of the current location data is computed by determining a center of gravity of each beacon image.

3. The apparatus according to claim 1, wherein the lens system comprises an out of focus lens system or a small aperture for creating diffraction.

4. The apparatus according to claims 1, wherein the fixed reference frame is defined relative to the earth.

5. The apparatus according to claim 1, wherein the processing unit is configured to determine light intensity or wavelength of the at least one light beam based on the image data, and to derive additional data as transmitted by the at least one beacon which modulated the light intensity or wavelength.

6. The apparatus according to claim 5, wherein the lens system is configured to:
   receive a consecutive series of light beams transmitted from the at least one beacon and transfer the consecutive light beams to the image sensor;
   the image sensor is configured to form consecutive pieces of image data based on the received consecutive light beams; and
   the processing unit is configured to determine consecutive light intensities or wavelength of the consecutive light beams based on the consecutive pieces of image data, and
   demodulate the consecutive light intensities or wavelength to derive the additional data.

7. A method of monitoring positions on an object having at least one beacon attached thereto, the method comprising:

receiving at least one light beam transmitted from the at least one beacon;

capturing a series of sequential images, each image substantially being a two-dimensional array of light values based on the received at least one light beam;

correlating the sequence of images with one or more predetermined patterns stored in the memory, thereby producing one or more two-dimensional correlation matrices;

identifying, based on the one or more two-dimensional correlation matrices, the at least one beacon within the image data based on a light signature of at least one light beam received from at least one beacon;

determining current location data of the at least one beacon based on the one or more two-dimensional correlation matrices;

comparing the current location data with former location data of the at least one beacon; and determining whether the object has moved relative to a fixed reference frame based on the comparison.

8. The method according to claim 7, further comprising calculating the current location data by calculating positions and solid vectors using subpixel resolution, wherein the subpixel resolution of the current location data is computed by determining a center of gravity of each beacon image.

* * * * *